United States Patent [19]

Gitcho

[11] 4,103,606
[45] Aug. 1, 1978

[54] COOKING DEVICE

[75] Inventor: Theodore N. Gitcho, Pana, Ill.

[73] Assignee: Mr. Drumstick, Inc., Pana, Ill.

[21] Appl. No.: 789,858

[22] Filed: Apr. 22, 1977

[51] Int. Cl.² .................. A23L 3/00; A47J 31/04; A47J 37/10
[52] U.S. Cl. .................. 99/443 C; 126/25 R; 99/332; 99/423; 99/450
[58] Field of Search .................. 99/352, 443 C, 427, 99/447, 450, 481, 340, 339, 446; 126/25 R, 9

[56] References Cited

U.S. PATENT DOCUMENTS

| | | | |
|---|---|---|---|
| 3,499,380 | 3/1970 | Gongwer | 99/443 C |
| 3,792,654 | 2/1974 | Turner | 99/427 |
| 3,861,288 | 1/1975 | Cluff | 99/446 |

*Primary Examiner*—Edward J. McCarthy
*Attorney, Agent, or Firm*—Charles B. Haverstock

[57] ABSTRACT

A cooking device for quickly and uniformly cooking food products, especially meat products, and for warming rolls and other bread products. The device includes an elongated housing substantially enclosable on all sides, a wheel frame assembly supporting the housing for movement, the housing having a plurality of side wall panels on opposite sides, at least some of which panels are movable thereon and removable therefrom, a structure forming a bed for coals or like material located in the housing near the bottom thereof, a cover adjacent one end of the housing which can be opened for installing and removing racks of food products into and from the housing, an pair of connected sprocket members mounted for rotation adjacent each opposite end of the housing, a drive motor operatively connected to one of the pairs of sprocket members for rotation thereof, a continuous flexible drive member cooperatively engageable with the sprocket members on each side of the housing, rod members extending between and connecting the flexible drive members at spaced locations thereon, some of the rod members having a pair of spaced hooks mounted near opposite ends thereof, at least one of the hooks on each rod being biased toward the other, a plurality of food racks cooperatively engageable with the hooks for pivotally supporting the food racks, a pair of rail members positioned in the housing to guide and support the food racks during movement, and a basin for containing a food flavoring substance positioned in the housing adjacent to one end thereof such that the food racks move therethrough during a cooking operation.

19 Claims, 11 Drawing Figures

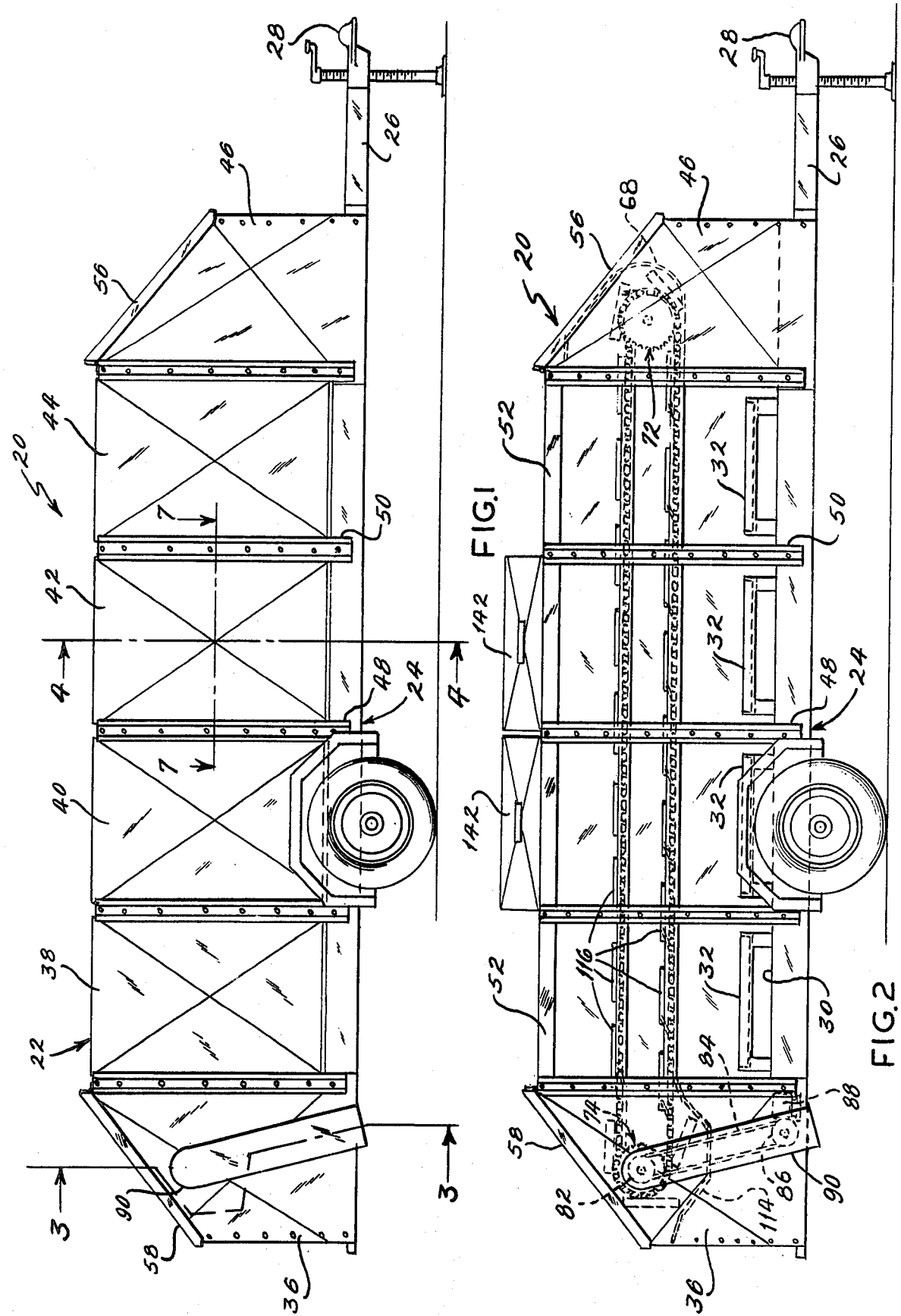

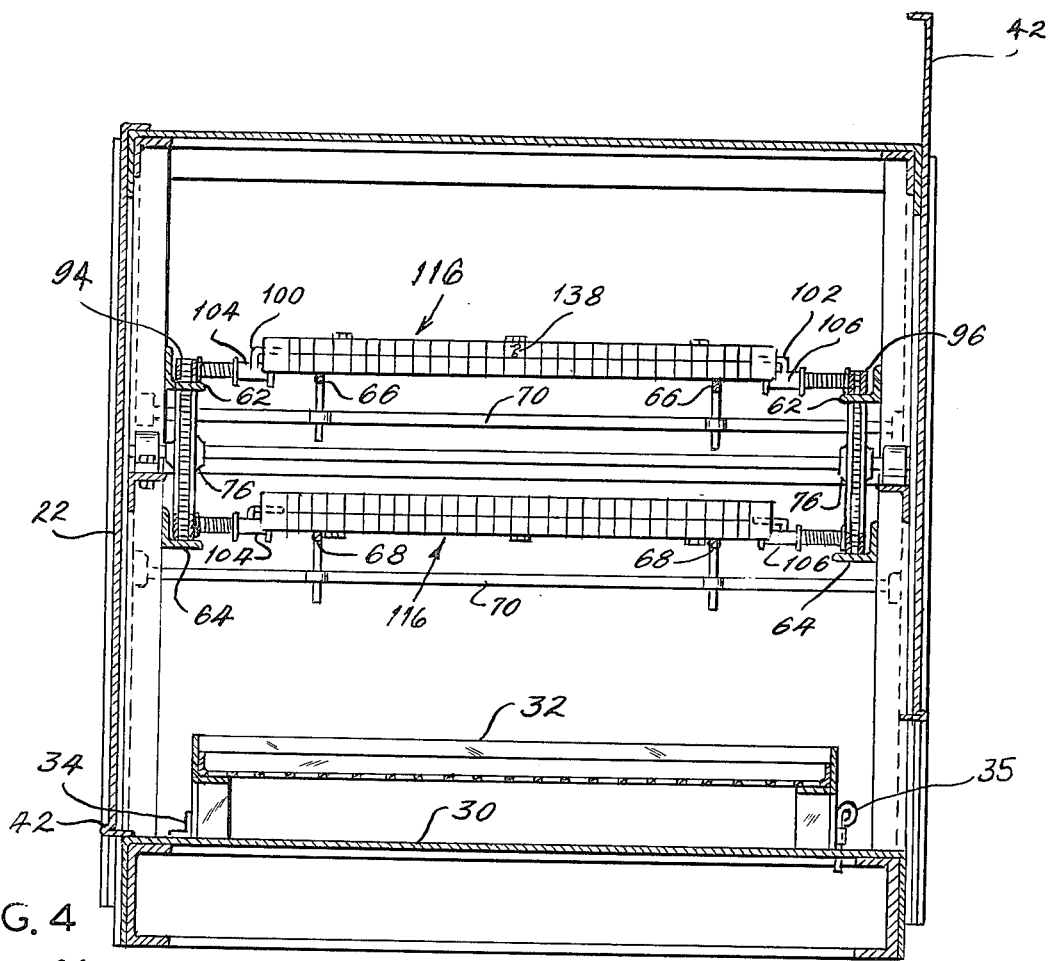
FIG. 4
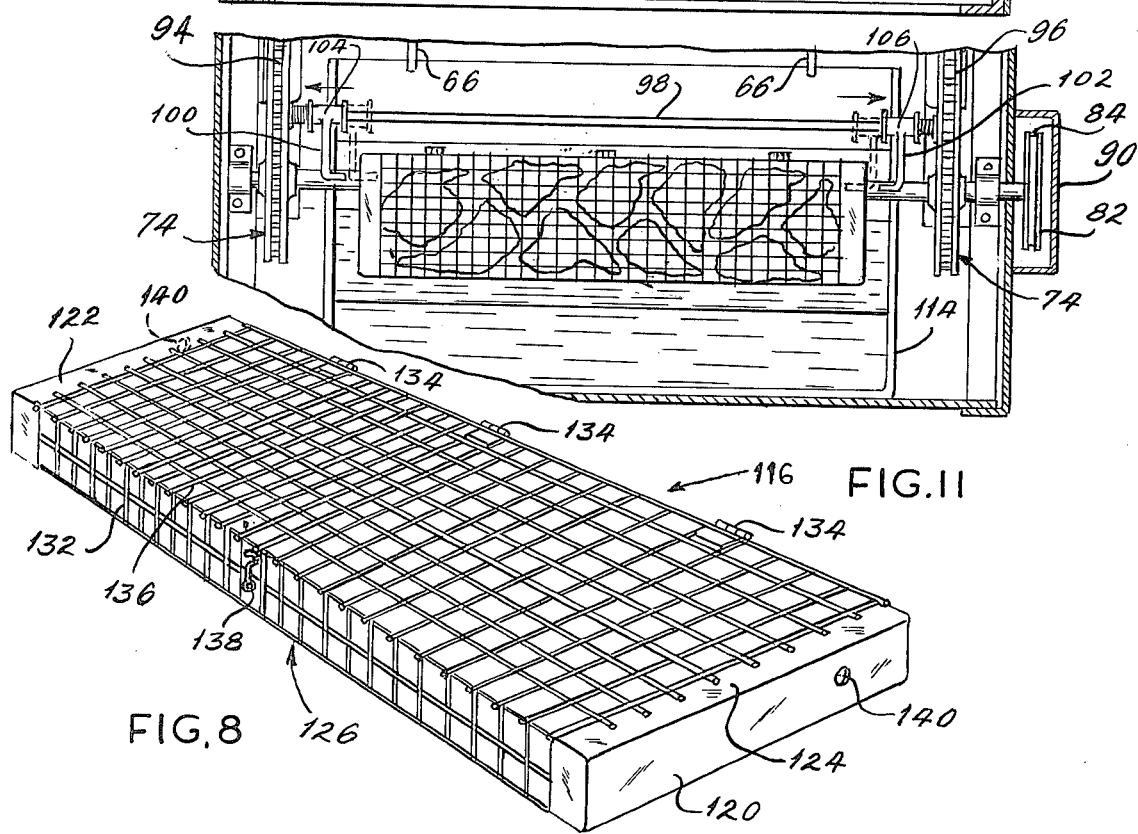
FIG. 11
FIG. 8

COOKING DEVICE

Many automatic cooking devices including cooking devices for mass producing cooked food items such as meat, fish and poultry items in order to feed large numbers of people have been devised and constructed in the past. Some of the known devices have had conveyor means, and some of them such as bakery ovens and the like have also had movable tray structures or food racks. The known devices have also included means to move a product while it is cooking along a predetermined path, whereby the cooking time is regulated by the speed and length of the conveyor means. For the most part, however, the known devices have required a connection to an external fuel source such as to a natural gas fuel source, a bottled fuel source or an electrical fuel source. Furthermore, the known devices have not included means operable during the cooking cycle to automatically dip the product being cooked into a seasoning substance, and none has employed removable grid structures which are used for holding and supporting products during the cooking operation in such a way that the products are automatically inverted in order to substantially equally cook both opposite sides thereof over the same heat source and in a continuous operation. Also, none of the known devices include hinged grid structures for holding and supporting food products which prevent the products from overturning and moving inside them during cooking; and, so far as known, it has not heretofore been contemplated to construct a cooking device suitable for cooking relatively large quantities of products in a continuous yet manageable operation, which device is fully and completely portable and is preferably constructed in the form of a trailer enabling it to be towed by an automobile or other vehicle.

It is therefore a principal object of the present invention to teach the construction and operation of a self-contained cooking device which is fully portable, which can have its cooking temperature accurately controlled, and which can be set up into operation in a relatively short period of time.

Another object is to accurately and uniformly cook food products such as meat products in a continuous operation.

Another object is to enable one or more persons to feed large numbers of persons in a relatively continuous manner.

Another object is to provide a cooking device which preferably uses charcoal as its cooking medium, and because of its structure minimizes the amount of fuel that is required to cook relatively large quantities of a product.

Another object is to make it possible for a single operator to cook large quantities of a food product in a continuous operation.

Another object is to relatively uniformly cook food products by exposing both opposites sides of the products to a heat source for substantially an equal amount of time.

Another object is to provide a cooking device in which meat products can be quickly and uniformly cooked with little or no shrinkage.

Another object is to provide an automatic cooking device into and from which individual racks of food products can be loaded and unloaded without interrupting the operation thereof.

Another object is to provide a device for cooking large quantities of food products in relatively little time, which device can be constructed to be fully portable and easily transported from site to site.

Another object is to teach the construction of a mass production cooking device which can be set up and placed in operation relatively easily and in a short time.

Another object is to enable seasoning of a food product as an automatic part of the cooking operation.

Another object is to provide a unique food holding device or rack construction for supporting food products during cooking thereof.

Another object is to provide an automatic cooking device which can be relatively simply and quickly loaded and unloaded with racks of products to be cooked.

Another object is to provide a relatively attractive and maintenance free automatic cooking device which is particularly adaptable for cooking relatively large quantities of food products.

Yet another object is to teach the construction and operation of an automatic cooking device which is relatively easy to clean and maintain and which includes means to relatively accurately control its cooking temperature.

These and other objects and advantages of the present cooking device will become apparent after considering the following detailed specification, reference being made to the accompanying drawings, wherein:

FIG. 1 is a side elevational view of a cooking device constructed according to the present invention;

FIG. 2 is a side elevational view similar to FIG. 1 but showing the subject device with its near side panels removed for clarity and with two optional bun or bread warmers installed thereon;

FIG. 4 is a cross-sectional view taken on line 4—4 of FIG. 1 but with one of the side panels in a raised condition;

FIG. 8 is a perspective view showing one of a plurality of removable racks for use with the subject device;

Figure 3:
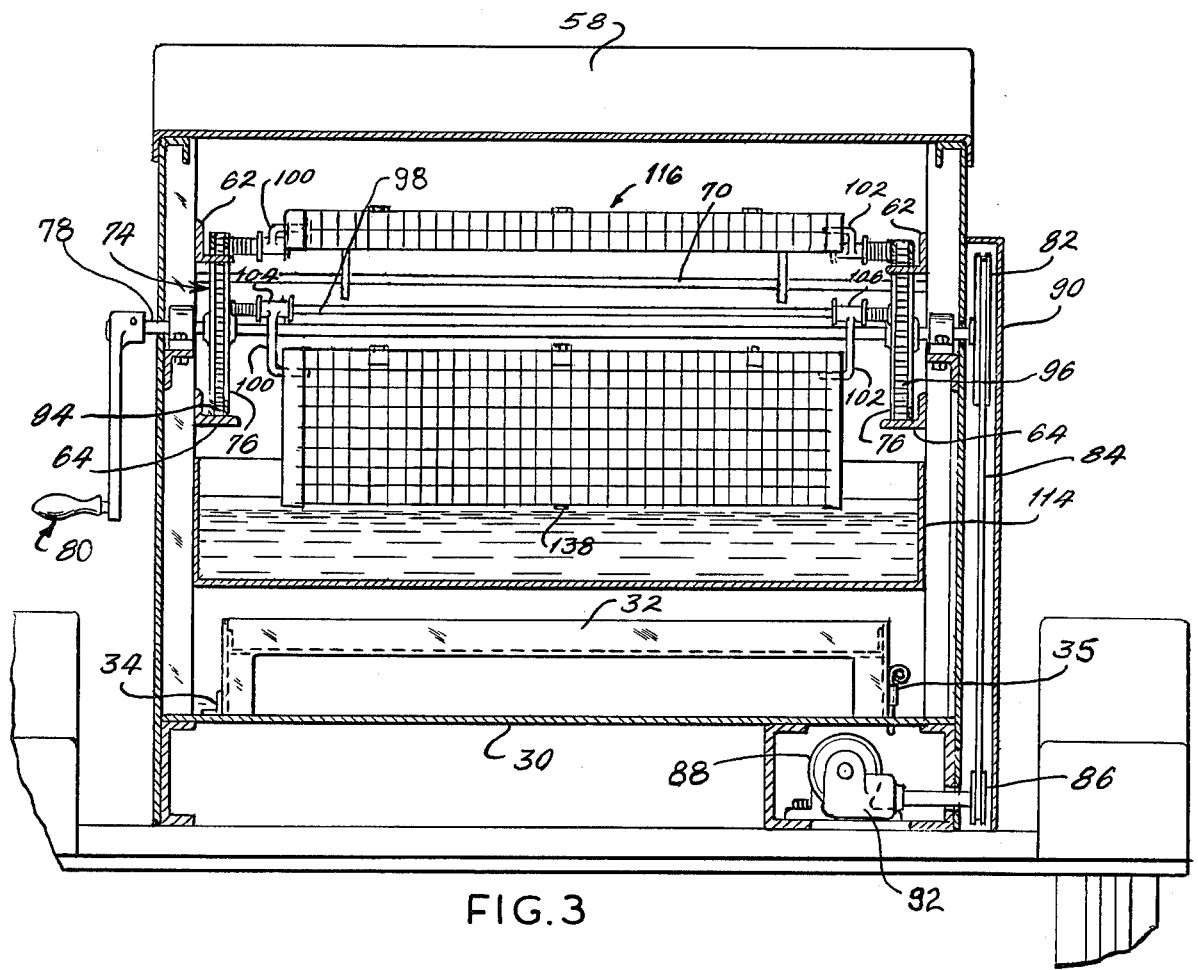
FIG. 3 is a cross-sectional view taken on line 3—3 of FIG. 1.

Referring to the drawings more particularly by reference numbers, number 20 in FIGS. 1 and 2 identifies a cooking device constructed according to the teachings of the present invention. The device 20 includes a housing 22 which is mounted for movement on a wheel frame assembly 24. The wheel frame assembly 24 has a forwardly extending portion 26 with means 28 for attaching the subject device to an automobile, truck or other vehicle used for towing it. The housing 22 has an inner bed portion 30 (FIG. 2) for supporting a plurality of relatively rigid metal rack members such as members 32. The members 32 form support structures on which charcoal or some other fuel can be spread, and are preferably but not necessarily mounted on the bed portion 30 by means such as stop 34 and one or more pins such as pin 35 (shown in FIG. 3) or in some other manner so that they can be easily removed for repair and cleaning the device.

Figure 7:
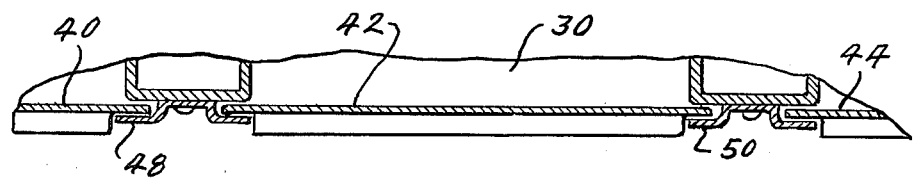
FIG. 7 is a fragmentary cross-sectional view taken on line 7—7 of FIG. 1.
Figure 6:
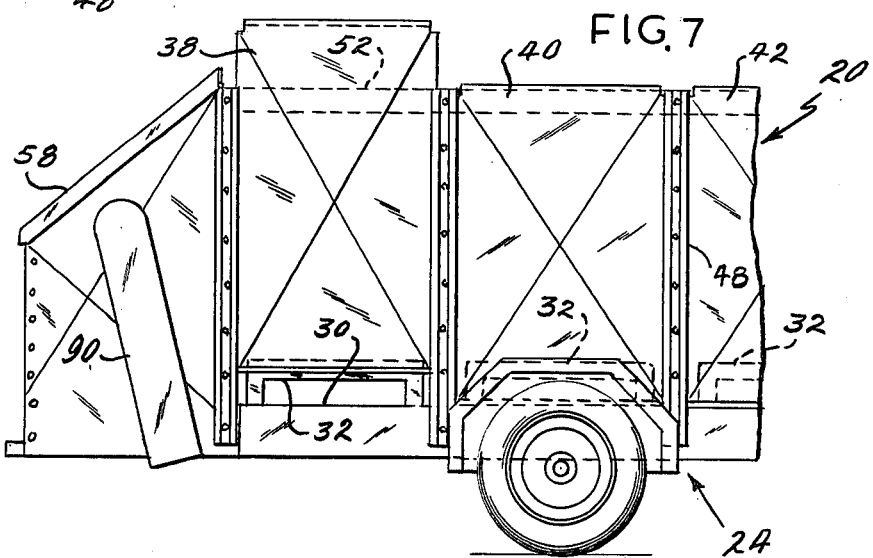
FIG. 6 is a fragmentary side elevational view showing one of the side panels in a raised condition to admit air for a charcoal fire.
Figure 5:
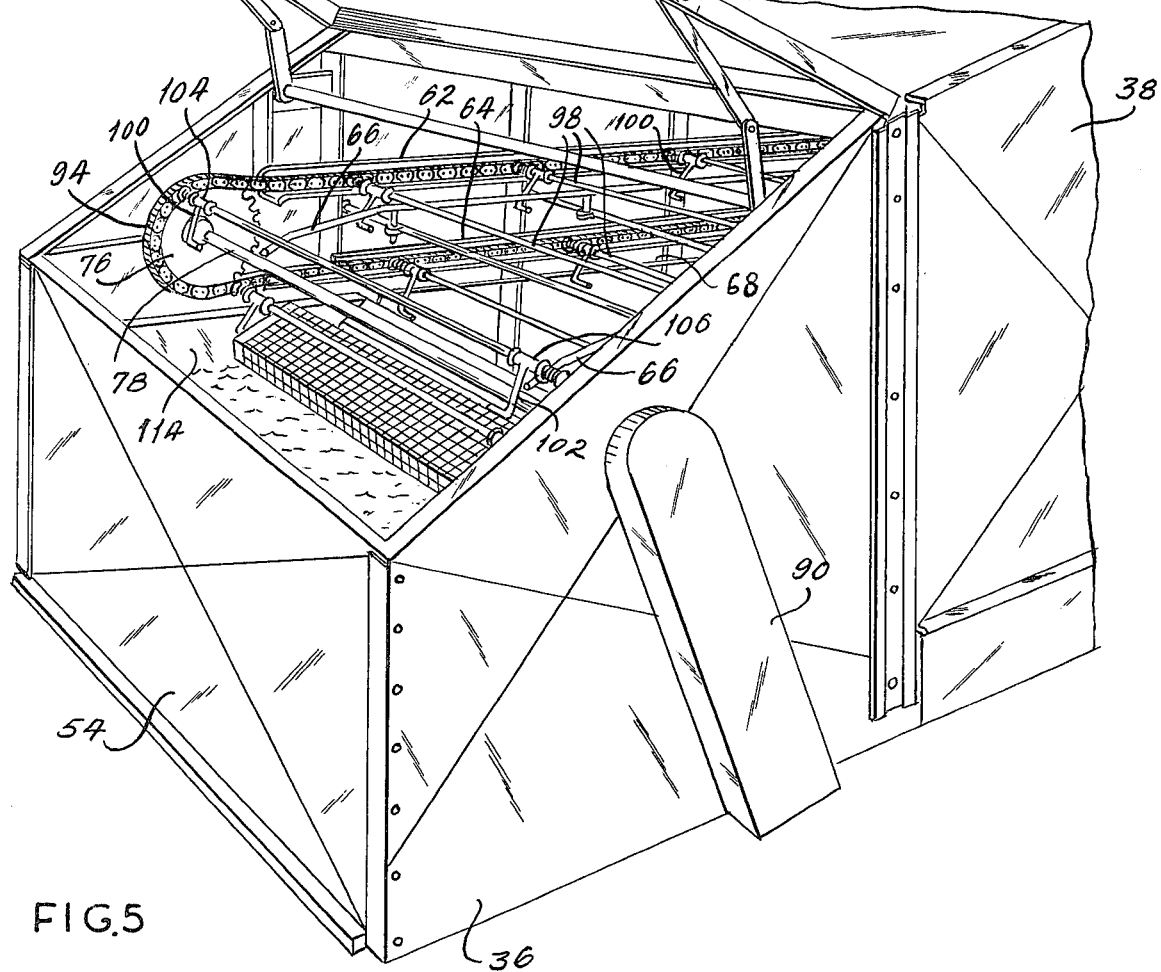
FIG. 5 is a fragmentary rear end perspective view of the subject device with a rear cover panel open.

The housing structure 22 also includes a plurality of side panels 36, 38, 40, 42, 44, and 46, and certain of the panels such as the panels 38, 40, 42, and 44 are mounted for vertical sliding movement in spaced vertical support posts such as support posts 48 and 50. Greater detail of this is shown in FIG. 7. A similar set of side panels is provided on the opposite side of the device, and the top of the device has similar fixed panels 52. All or some of the panels may be insulated using a commercially available material such as asbestos or the like to reduce heat loss and to make the device more efficient. The front and back ends of the subject device have fixed panels such as rear end panel 54, and the front and back ends of the device also have upper hinged covers 56 and 58, respectively. These covers may include means such as means 60 to maintain them in an open condition as shown in FIG. 5. When the device is in operation one or more of the adjustable side panels 38, 40, 42 and 44 will normally be at least slightly raised as shown exaggerated in FIG. 6 to admit air for sustaining the charcoal fire in the housing 22, and the rear upper hinged cover 58 and/or possibly the front hinged cover 56 may be frequently opened or maintained open for loading and unloading the device as will be described. Furthermore, when it becomes desirable to clean or maintain the device some or all of the movable panels may be entirely removed therefrom along with certain of the components inside the housing 22 such as the support structures 32 to facilitate such operations. For reasons of appearance and durability and to further facilitate cleaning and repairing the device, it is preferred that all or most of its structural members be made of stainless steel or some like material.

As shown in FIGS. 4–5, the subject device 20 has two sets of spaced angle iron members or guides 62 and 64 located in the housing 22. The upper angle members 62 extend substantially between opposite ends and along opposite sides of the housing 22, and are similarly spaced above the lower bed portion 30 to form tracks for the upper reaches of drive means to be later described. In a like manner, lower tracks are formed in the housing 22 by the two opposed angle members 64 which respectively are spaced below the angle members 62 and extend along opposite sides of the device to provide support for the lower reaches of the drive means. Also extending substantially between opposite ends of the housing 22 are two sets of rail members such as rail members 66 and 68. The rail members 66 are spaced between and for the most part extend in the housing 22 at approximately the same elevation above the lower bed portion 30 as the upper angle members 62 as shown in FIG. 4. The rail members 68 are similarly positioned with respect to the lower angle members 64. The rail members 66 and 68 are supported by a plurality of spaced crossbars such as crossbars 70 which are suitably secured to opposite sides of the housing 22, and during operation they function to support a number of food racks which move in spaced rows on the rails 66 and 68. It should be noted that the opposite end portions of each of the rail members 66 and 68 should preferably be bent or curved in a manner such as illustrated in FIGS. 2 and 5 to allow them to properly guide the food racks during their movement through the housing 22, especially when the food racks are moving around sprocket assemblies 72 and 74, and also to insure that the food racks are inverted when moving around the assemblies 72 and 74 so that both opposite sides of the food products therein will be exposed to the heat source for substantially equal periods of time.

Located near opposite ends of the subject device are positions in the housing 22 for mounting the spaced drive sprocket assemblies 72 and 74. Each of the drive sprocket assemblies 72 and 74 includes a pair of spaced sprocket wheels 76 which are positioned near opposite sides of the housing 22 and connected to a shaft member such as member 78 (See FIG. 5). The shaft member 78 for the rear end sprocket assembly 74 is journaled by suitable means such as pillow blocks to the housing 22, and has portions which extend through opposite sides thereof, including through the opposite side wall panels 36. One end of the rear sprocket shaft 78 carries an optional handcrank 80 (shown in FIG. 3), and the opposite extended end of the shaft 78 carries a sheave or pulley 82 which cooperates with a drive belt 84 as is also shown in FIG. 2. The drive belt 84 also cooperates with another sheave 86 which is driven by a motor 88. A cover or guard such as cover 90 is preferably mounted over the drive sheaves 82 and 86 and the drive belt 84, and the drive motor 88 may further include a speed reducer 92 which may be of known construction. The purpose of the handcrank 80 is to provide alternate means which may be used to manually rotate the drive sprocket assembly 74 if for some reason it becomes desirable or necessary to do so, for example, in situations where no power is available to operate the drive motor 88 or where trouble develops and the machine must be operated manually to prevent food waste. The handcrank 80 can also be used instead of the motor drive if a different cooking time is required.

Two similar continuous flexible drive chains 94 and 96 are mounted near opposite sides of the housing 22, and each extends around the sprocket wheels 76 located at opposite ends of the subject device. Each of the drive chains 94 and 96 has upper and lower reaches which are respectively supported by the angle iron members 62 and 64 near the sides of the housing 22 (as shown in FIG. 5).

Figure 10:
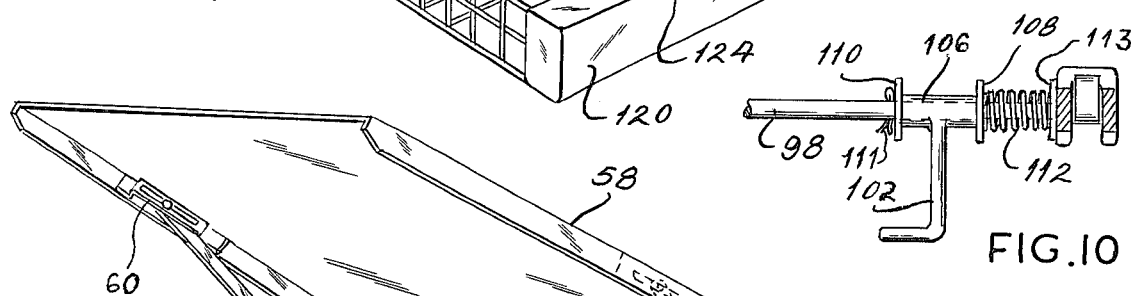
FIG. 10 is an enlarged fragmentary view showing the details of a preferred form of means for mounting the removable food racks on drive means of the subject device; and, FIG. 11 shows one of the racks being mounted on the drive means of the subject device, the rack mounting means being shown open to receive a rack in solid outline and engaging the rack in dotted outline.

Attached at corresponding locations and at approximately equally spaced intervals along the drive chains 94 and 96 are means for removably connecting a plurality of individual food racks to the drive chains 94 and 96. The details of the means preferred for this purpose are shown in FIGS. 4, 5 and 10, and include a plurality of rod members such as rod members 98, each of which has a pair of spaced and spring biased, hook-like members rotatably mounted thereon such as hooks 100 and 102. The rods 98 are connected by welding or otherwise attaching their opposite ends to opposed links of the chain members 94 and 96 at approximately equally spaced intervals therealong. The hooks 100 and 102 include tubular portions 104 and 106, respectively, which are rotatably mounted on the rods 98, and the hooks are positioned so that they extend toward each other as shown. FIG. 10 shows in greater detail how the hooks 102 (or 100) are mounted on the rods 98. As can be seen, each of the tubular portions 106 (or 104) is positioned on its respective rod 98 between a pair of spaced flanges or washer members 108 and 110 with the washer 110 abutting a fixed member 111. A spring 112 is positioned between the washer member 108 and another washer 113 to bias the hooks 102 into abutment with the washer 110.

A similar hook is provided adjacent each end of each of the rods 98, although it is only necessary that one of the hooks 100 or 102 on each rod be spring biased as disclosed. Each pair of the opposed hooks 100 and 102, as shown, is constructed to resiliently engage and pivotally support one end portion of a food rack during its movement through the subject device. Only one pair of hooks such as the hooks 100 and 102 is required to support each rack, and the hooks engage the racks nearer one side edge such as the leading side edge than the other. The racks slide on and are supported by the upper rail members 66 as they are moved in one direction between the sprocket assemblies 72 and 74 as by the upper reaches of the drive chains 94 and 96, and they slide on and are supported by the lower rail members 68 as they are moved oppositely by the lower reaches of the drive chains 94 and 96. This method of attaching the food racks is preferred because it makes the racks relatively easy to install and remove without interrupting or stopping the operation, and this is relatively easy to do even when the racks are full. Furthermore, this form of off-center pivoted support means allows the food racks to be inverted as they move around the drive sprocket assemblies 72 and 74 at both opposite ends of the device, which assures that both opposite sides of the food products in the racks will be exposed to the hot coals for substantially equal amounts of time.

Also located preferably at the rear end of the subject device below the drive sprocket assembly 74 is a pan or reservoir 114 for containing a substance such as a flavoring substance which may be applied to the food products as an automatic part of the cooking operation. The reservoir 114 is conveniently located for filling it, and it is positioned so that during the cooking operation the racks containing food products move through the reservoir and in so doing are immersed in the flavoring and uniformly and completely coated therewith. The reservoir 114 should also be positioned so that when the racks which support the products move out of it any excess flavoring substance will drain off and remain in the reservoir so that there will be a minimum of waste. With only slight modification of the device as disclosed, the reservoir 114 could be alternatively positioned near the front end of the device if desired, or a separate reservoir could be provided at both ends although a front end reservoir is somewhat less convenient than a rear end reservoir because of the forwardly extending portion 26 of the wheel frame assembly 24.

Figure 9:
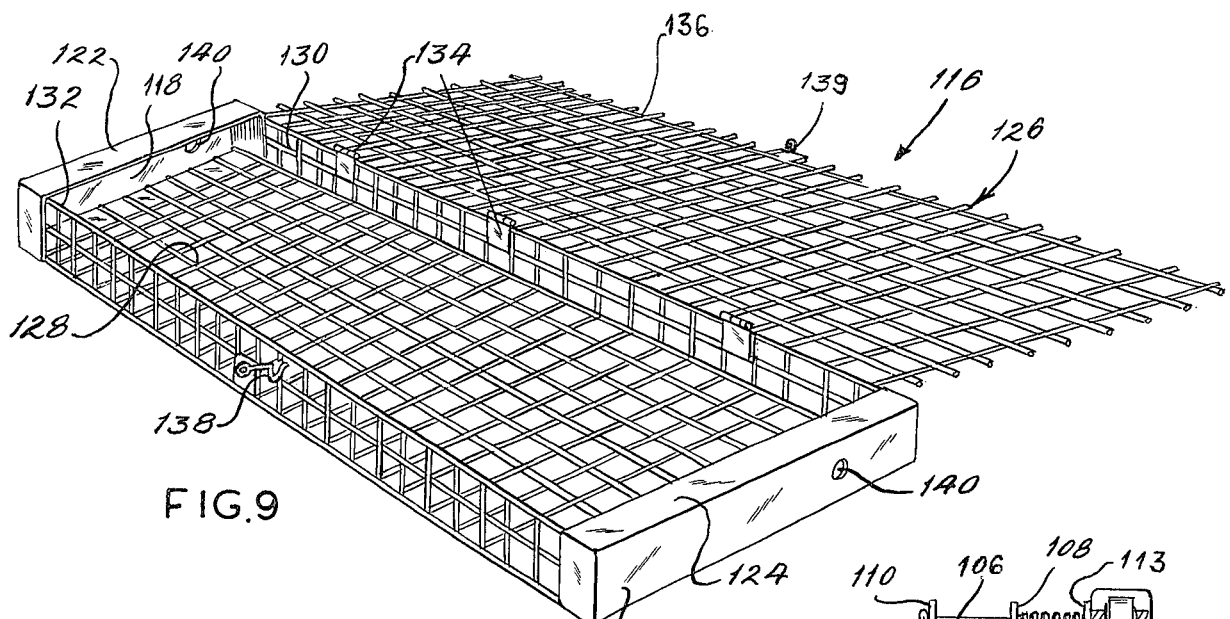
FIG. 9 shows the rack of FIG. 8 in an open condition.

FIGS. 8 and 9 show a typical food rack 116 for use with the subject device 20. The food rack 116 includes two similar spaced end walls 118 and 120 which are flanged and shown being rectangular in shape and being formed of metal folded to form side walls such as side walls 122 and 124. The end walls 118 and 120 are positioned in opposed relationship to each other, and along with the side walls 122 and 124 they support a wire grid shaped basket 126 which has a bottom wall portion 128 and opposite side wall portions 130 and 132. The basket wall 130 also has spaced hinges 134 attached thereto, and the hinges 134 are connected to a grid-like closure wall 136. During filling of the rack 116, the closure wall 136 is opened as shown in FIG. 9; and, after the rack has been filled, the closure wall 136 is hingedly moved to a position over the products and is attached to the opposite basket side wall 132 by suitable means such as clasp 138 and eyelet 139 or the like. When the basket is closed, the products are confined and held therein and to a certain extent will be prevented from moving in the basket during the cooking operation. It is important that each of the rack end walls 118 and 120 has a hole 140 formed therein at locations such as shown in FIGS. 8 and 9. The holes 140 in the opposite end walls of the baskets are aligned and cooperate with the spring biased hooks 100 and 102 to attach the baskets to the drive chains 94 and 96. FIG. 11 shows one of the baskets being loaded (or unloaded) in the subject device in a filled condition. If desired, loading and unloading may also be performed at the front end of the device with the front hinged cover member 56 open.

In order to operate the subject device, charcoal or some other like substance or fuel is placed on the support structures 32 on the lower bed 30 preferably in a hot condition, although it can be ignited after it is in place. The operator then ajusts the position of one or more of the side panels such as the side panels 38-44 on one or both sides of the device as shown exaggerated in FIG. 6 to admit a proper amount of air to control the heating temperature produced by the charcoal. The number of panels and the amount that the side panels are raised depends on the desired cooking temperature for the products being cooked, and it will be appreciated that the wide range of ventilation which can be provided with the subject construction allows the heat produced by the charcoal to be easily and relatively accurately maintained. Once the fire has been properly laid and regulated, the operator will fill the reservoir 114 to the proper depth with a desired flavoring substance, and the device will be in a condition for operation. To operate the device, the operator or his assistant will load the products to be cooked into the trays or food racks 116 while the trays are open, and then will close and latch the trays and mount the trays in the device by means of the hooks 100 and 102 which cooperate with the holes 140 in the opposite end walls of the racks. Note that with this construction whether the trays are mounted as shown in FIG. 11 or they are mounted backwards or upside down makes no difference. Before mounting the racks, however, the device normally will have been connected to a suitable power source for operating the drive motor 88, unless it is desired or necessary to operate the device manually using the handcrank 80. A switch (not shown) can be provided to control the energizing and deenergizing of the drive motor 88. The racks containing the food products are consecutively loaded into the subject device and each rack moves from one end to the other first along the upper rails 66, and then after being inverted at the opposite end each is pulled back over the lower rails 68 and through the seasoning to complete one cycle of the cooking operation, which in a typical situation will take about eight minutes. One or more of such cooking cycles may be required to completely cook a particular food product depending on the type of product involved. With the subject device as constructed, it is possible for one or more persons to do all of the cooking for a very large crowd numbering into the thousands, and it has been found that the ability to accurately maintain the cooking temperature makes it possible to cook many type food products such as meat products with little or no shrinkage and in a continuous process.

As an added feature, one or more optional bun or bread warmers such as warmers 142 may be located on the top of the subject device as shown in FIG. 2. The bread warmers 142 may be constructed as permanent parts of the subject device or as separate removable parts, and they may be containers which are exposed to the heat rising in the subject device. If warmers are used then it will not usually be necessary to insulate the top portions of the device where the warmers are located.

Thus there has been shown and described a novel cooking device which fulfills all of the objects and advantages sought therefor. It will be apparent, however, that many changes, modifications, variations, and other uses and applications for the subject device are possible and contemplated. All such changes, modifications, variations, and other uses and applications which do not depart from the spirit and scope of the invention are deemed to be covered by the invention which is limited only by the claims which follow.

I claim:

1. A cooking device comprising an elongated housing having spaced opposite side and end walls and a closure wall extending therebetween, means for supporting fuel located in the housing near the bottom thereof, sprocket means mounted for rotation in the housing at spaced locations between the opposite ends thereof, a pair of continuous flexible drive members mounted in opposed relationship to each other in the housing, each of said drive members being engageable with the spaced sprocket means located in said housing and having reaches which extend therebetween, means for connecting the drive members at spaced corresponding locations therealong including a plurality of rod members attached therebetween, spaced and opposed means pivotally supported on selected ones of said rod members, a plurality of rack members for holding food products to be cooked, each of said rack members having spaced end walls with aligned means for engaging the spaced and opposed means on a selected one of the selected rod members, means for supporting the rack members in a first position during movement in one direction in the housing between the spaced sprocket means, means for supporting the rack members in a different position during movement in the opposite direction in the housing, means operatively engageable with the sprocket means for rotation thereof, and means providing access into the housing for enabling attaching the rack members to and detaching the rack members from the means on the rod members, the spaced and opposed means pivotally supported on selected ones of said rod members including a pair of hook-like members mounted thereon, said hook-like members of each pair having portions that extend toward each other, and means biasing at least one of the hook-like members on each of the selected rod members toward the opposed hook-like member thereon.

2. The cooking device defined in claim 1 including means for controllably admitting air into said housing to support combustion of fuel therein.

3. The cooking device defined in claim 1 wherein the means operatively engageable with the sprocket means include motor drive means.

4. The cooking device defined in claim 1 wherein the means operatively engageable with the sprocket means include crank means.

5. The cooking device defined in claim 1 wherein at least some of the walls of said housing are insulated.

6. The cooking device defined in claim 1 including container means on said housing in position to be exposed to the heat generated therein.

7. The cooking device defined in claim 1 including a wheel frame assembly supporting said housing for movement, said wheel frame assembly having means thereon for coupling to a vehicle so that the device can be towed.

8. The cooking device defined in claim 1 wherein the means for supporting the rack members in a first position during movement in one direction in the housing include a first pair of spaced opposed rail members which extend substantially the distance between the spaced sprocket means in said housing, and the means for supporting the rack members in a different position during movement in the opposite direction in the housing include a second pair of rail members which extend substantially the distance between the sprocket means, said first pair of rail members being located spaced above said second pair and both of said pairs of rail members being spaced above said fuel support means.

9. The cooking device defined in claim 1 including reservoir means positioned in the housing below one of the spaced sprocket means in said housing for holding a supply of a food flavoring substance, said reservoir means being positioned so that the rack members for food products move therethrough and are immersed in the substance therein.

10. A cooking device comprising an elongated housing having spaced opposite side and end walls and a closure wall extending therebetween, means forming a bed for charcoal located in the housing near the bottom thereof, two pairs of spaced track members formed by spaced opposed members located in the housing, one of said spaced pairs of track members being located above the other pair and both of said pairs being spaced above said bed forming means, a pair of sprocket wheels mounted for rotation in the housing adjacent each opposite end thereof, the sprocket wheels of each pair being located near the opposite sides of said housing, an endless flexible drive member mounted in the housing adjacent each of the opposite side walls thereof, each of said drive members engaging one sprocket wheel of each of the pairs of sprocket wheels and having upper and lower reaches which extend therebetween, the upper reaches of said flexible drive members being movable on and supported by the upper pair of track members and the lower reaches of said flexible drive members being movable on and supported by the lower pair of track members, means for connecting the drive members on opposite sides of the housing at spaced locations therealong including a plurality of rod members, a pair of spaced and opposed members pivotally supported on selected ones of said rod members adjacent opposite ends thereof, means biasing the pair of opposed members on each of the selected rod members toward each other, a plurality of rack members including containers for food products to be cooked, each of said rack members having spaced end walls with aligned means therein for engaging a selected one of the pairs of spaced and opposed members on one of the selected rod members, means attached to the housing for supporting the rack members in a first position during movement in one direction in the housing, and other means attached to the housing for supporting the rack members in a different position during movement in the opposite direction in the housing, means operatively engageable with one of the pairs of sprocket wheels for rotating the pair of sprocket wheels to move the flexible drive members and the rack members attached thereto whereby the rack members move along paths that extend between and around the sprocket wheels at opposite ends of the housing, and means located near one of the opposite ends of said housing for providing access into the housing for loading and unloading purposes.

11. The cooking device defined in claim 10 wherein the spaced opposite side walls of said housing include a plurality of panel members, and means for adjusting the position of at least one of said panel members to control the amount of air admitted into said housing.

12. The cooking device defined in claim 10 including container means mounted below and adjacent to at least one of said pairs of sprocket wheels for holding a food flavoring substance, said container means being positioned such that the rack members move therethrough and are immersed in the substance therein.

13. The cooking device defined in claim 10 wherein the means operatively engageable with one of the pairs of sprocket wheels for rotation thereof include a crank member.

14. The cooking device defined in claim 10 including means supporting said housing for movement over the ground.

15. The cooking device defined in claim 10 wherein the spaced and opposed means mounted adjacent opposite ends of the rod members include pairs of hook-like members, the hook-like members on each of said rod members having portions that extend toward each other, and the aligned means in the spaced end walls of said rack members are off-center holes for cooperatively receiving the hook members on a selected one of the rod members.

16. The cooking device defined in claim 10 wherein the means for supporting the rack members during movement in said one direction in the housing include a first pair of rail members and said other means for supporting the rack members during movement in the opposite direction in the housing include a second pair of rail members spaced below said first pair of rail members, both the first and second pairs of rail members being spaced above said bed forming means and the rail members of each pair having curved opposite end portions.

17. A cooking device comprising an elongated housing having spaced opposite side and end walls and a closure wall extending therebetween, said housing having a plurality of panel members forming at least one of the opposite side walls thereof, at least one of said panel members being positionally adjustable on the housing to form an opening to controllably admit air into said housing, means located in and near the bottom of said housing forming a bed on which fuel can be spread, a sprocket assembly mounted in the housing adjacent to each of the opposite ends thereof, each of said sprocket assemblies including a rotatable shaft member having sprocket wheels thereon located adjacent to the respective opposite side walls of said housing, means journaling the sprocket wheel assemblies to the housing, a pair of continuous flexible drive members mounted in opposed relationship adjacent to the respective opposite side walls of said housing, each of said drive members being operatively engageable with the sprocket wheels of said sprocket assemblies located adjacent to the same side wall of said housing, each of said drive members having spaced upper and lower reaches which extend therebetween above said bed forming means, means connecting the drive members adjacent opposite side walls at spaced corresponding locations therealong including a plurality of rod members having opposite end portions attached to the respective drive members, a pair of spaced and opposed hook-like members pivotally mounted on each of said rod members adjacent to the respective opposite end portions thereof, spring means biasing at least one member of the pair of hook-like members on each of the rod members toward the opposed hook-like member thereon, a plurality of rack members for holding food products to be cooked, each of said rack members including spaced opposite end walls and a grid-like closure wall extending therebetween, said grid-like closure wall including hingedly connected portions which can be opened for loading and removing food products, the spaced opposite end walls of each of said rack members having aligned holes therein for cooperatively receiving the pair of spaced and opposed hook-like members of a selected one of said rod members, means for supporting each of said rack members in a first position during movement in one direction in the housing when operatively engaged with the rod members associated with the upper reaches of the respective drive members, means for supporting the rack members in a second inverted position during movement in the opposite direction in the housing when operatively engaged with the rod members associated with the lower reaches of said drive members, means operatively engageable with one of the sprocket assemblies for rotating the sprocket wheels thereof and for moving the drive members, container means mounted adjacent to and below one of said sprocket assemblies for containing a food flavoring substance, said container means being positioned such that the rack members move therethrough and are immersed in the substance contained therein, and means located near at least one of the opposite ends of said housing providing access to the rack members.

18. The cooking device defined in claim 17 including means mounting the device for movement, said means including a trailer having coupling means for attaching to a vehicle or the like.

19. The cooking device defined in claim 17 wherein the end walls of the rack members include elongated rectangular wall portions having opposite ends, the aligned holes therein being located closer to one of said opposite wall ends than to the other.

* * * * *